United States Patent
Mulfinger et al.

(10) Patent No.: US 8,333,598 B2
(45) Date of Patent: Dec. 18, 2012

(54) CONNECTOR ASSEMBLIES HAVING FLEXIBLE CIRCUITS CONFIGURED TO DISSIPATE THERMAL ENERGY THEREFROM

(75) Inventors: Robert Neil Mulfinger, York Haven, PA (US); Richard Elof Hamner, Hummelstown, PA (US); Jason M'Cheyne Reisinger, Carlisle, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 76 days.

(21) Appl. No.: 13/022,187

(22) Filed: Feb. 7, 2011

(65) Prior Publication Data

US 2012/0202370 A1  Aug. 9, 2012

(51) Int. Cl.
*H01R 12/00* (2006.01)
(52) U.S. Cl. .......................................................... 439/67
(58) Field of Classification Search .................. 439/67, 439/78, 65; 361/704, 720, 688; 174/117 R
See application file for complete search history.

(56) References Cited

U.S. PATENT DOCUMENTS

| | | | |
|---|---|---|---|
| 3,582,865 A * | 6/1971 | Franck et al. | 439/67 |
| 5,065,279 A * | 11/1991 | Lazenby et al. | 361/720 |
| 5,963,427 A * | 10/1999 | Bollesen | 361/704 |
| 6,223,814 B1 * | 5/2001 | Moresco et al. | 165/185 |
| 6,302,704 B1 * | 10/2001 | Belanger, Jr. | 439/67 |
| 6,769,920 B1 * | 8/2004 | Mease et al. | 439/67 |
| 7,086,869 B1 * | 8/2006 | Dangler et al. | 439/67 |
| 7,310,228 B2 * | 12/2007 | Chen | 361/695 |
| 7,438,582 B2 * | 10/2008 | Taylor | 439/342 |
| 7,470,862 B2 * | 12/2008 | Lin et al. | 174/117 R |
| 7,626,817 B2 * | 12/2009 | Rapp | 361/688 |
| 8,113,851 B2 * | 2/2012 | Hamner et al. | 439/65 |
| 2008/0227314 A1 * | 9/2008 | Taylor | 439/78 |

* cited by examiner

*Primary Examiner* — Alexander Gilman

(57) ABSTRACT

A connector assembly that includes a communication connector comprising a base frame and a moveable side that is supported by the base frame. The moveable side has a mating array of terminals thereon and is configured to move with respect to the base frame between retracted and engaged positions to engage a communication component. The connector assembly also includes a flexible circuit including a flex interconnect that has opposite exterior surfaces. The flexible circuit is coupled to the moveable side. The connector assembly also includes a plurality of heat-dissipation elements that are attached to the flex interconnect and project away from one of the exterior surfaces. The heat-dissipation elements are configured to conduct thermal energy from the flex interconnect and transfer the thermal energy to an ambient environment.

20 Claims, 7 Drawing Sheets

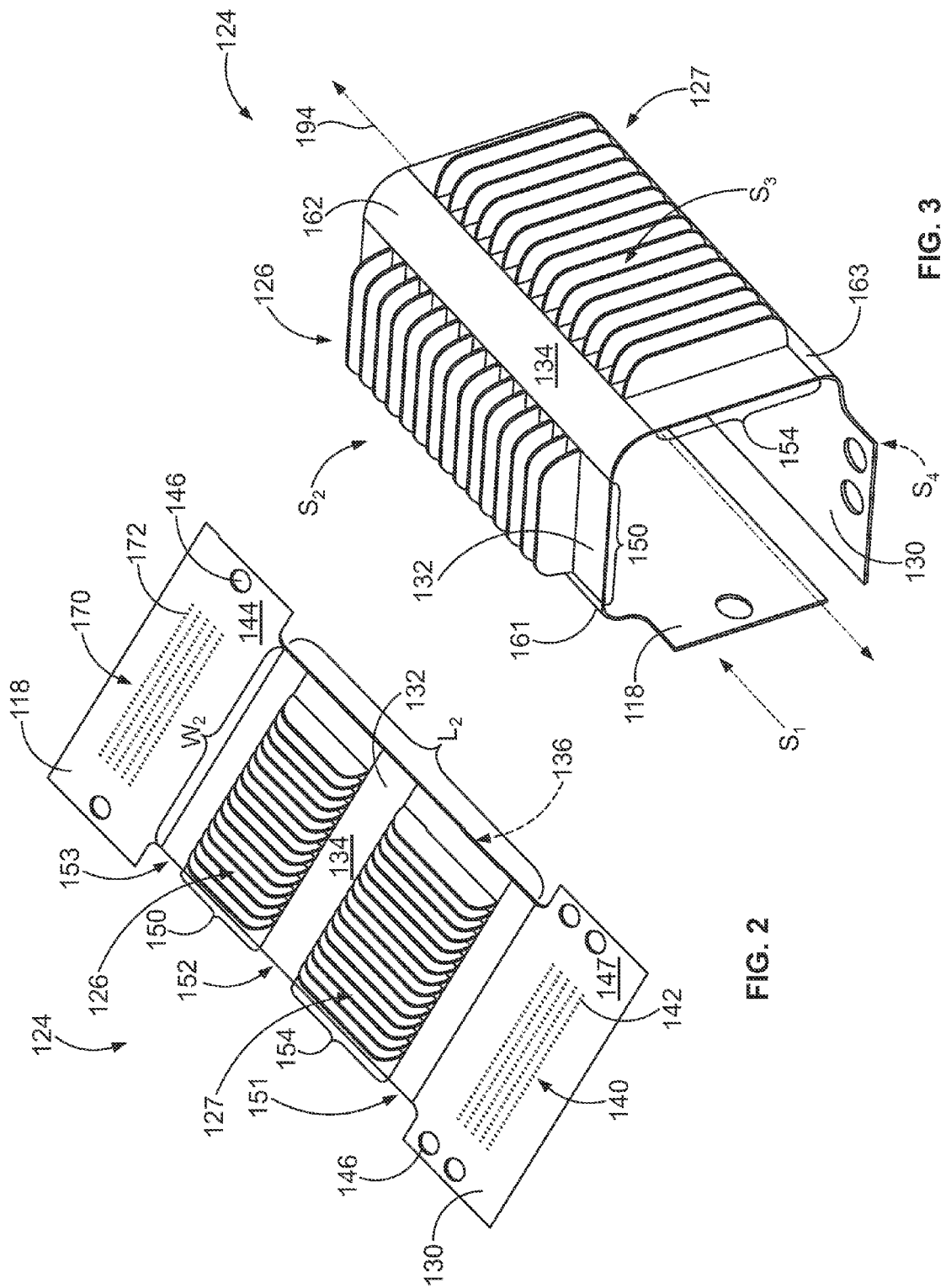

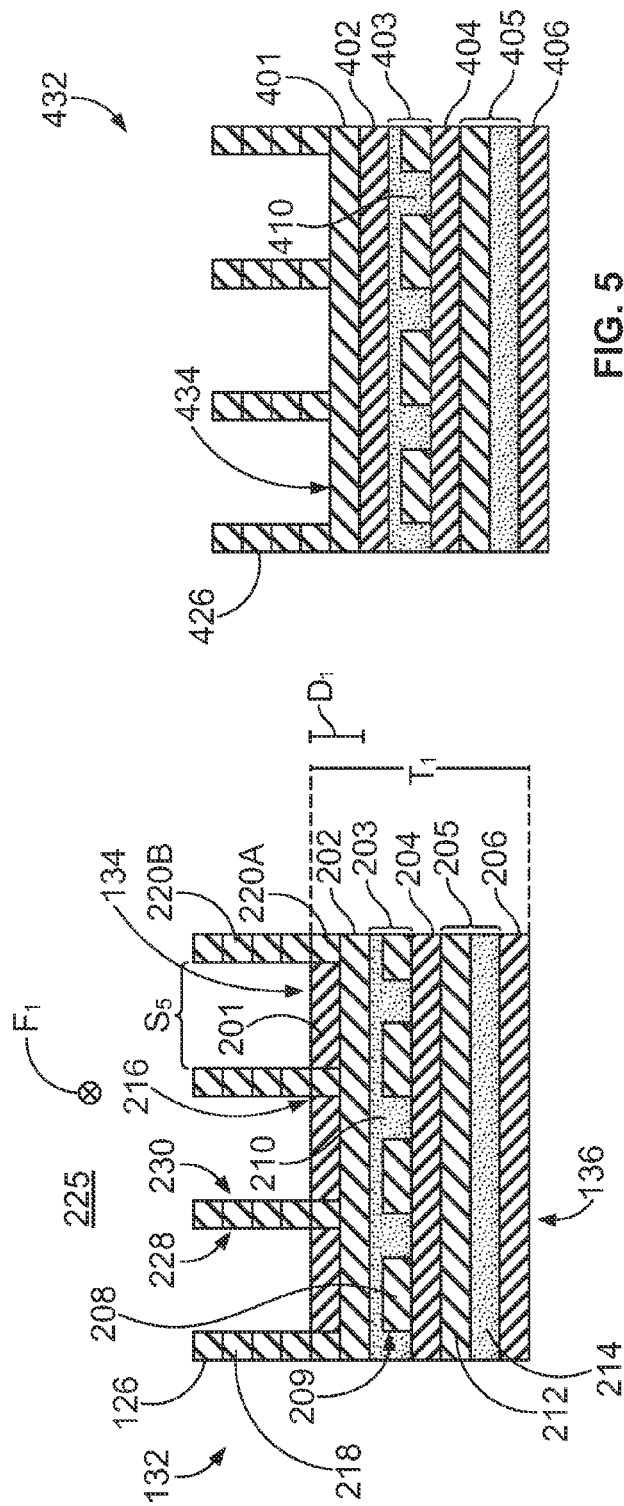
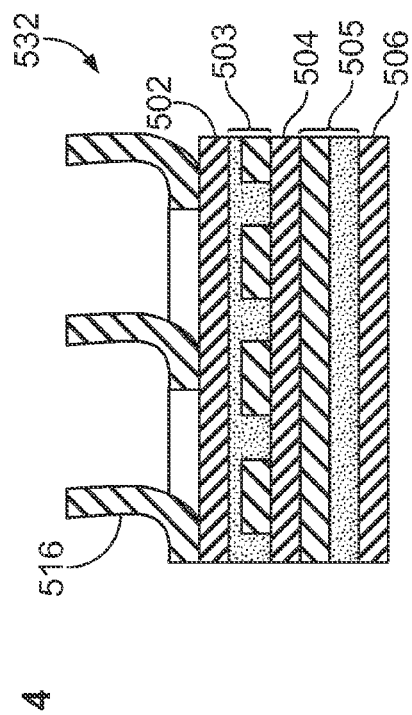
FIG. 4
FIG. 5
FIG. 6

CONNECTOR ASSEMBLIES HAVING FLEXIBLE CIRCUITS CONFIGURED TO DISSIPATE THERMAL ENERGY THEREFROM

BACKGROUND OF THE INVENTION

The subject matter herein relates generally to flexible circuits (or flex circuits) and connector assemblies, and more particularly, to connector assemblies that are configured to remove thermal energy from the flexible circuit.

Some communication systems, such as servers, routers, and data storage systems, utilize flexible circuits for transmitting data signals (optical or electrical) and electrical power through the system. Flexible circuits may have a power line that includes a power conductor and a corresponding ground conductor. The power conductor has predetermined dimensions that permit the transmission of a desired amount of power between electrical components. However, when power is conveyed through the flexible circuit, thermal energy is generated. In some cases, the thermal energy may cause the temperature of the flexible circuit to rise to a level that may damage sensitive electronic devices that are mounted on or near the flexible circuit.

U.S. Pat. No. 7,626,817 proposes a three-dimensional electronic assembly that includes a plurality of flex circuit sub-assemblies that are joined together at opposite ends. The flex circuit sub-assemblies in the '817 Patent are separated from each other by spacers between the opposite ends and may include various heat transfer mechanisms to cool the flex circuit sub-assemblies. However, the proposed heat transfer mechanisms may be impractical for certain applications. For example, the '817 Patent proposes using embedded heat sinks or heat pipes, liquid transfer mechanisms, and also an enclosure that is designed to operate as a heat sink. Such mechanisms may limit a range of movement of the flex circuit sub-assemblies and/or may not effectively dissipate the generated heat and, consequently, may only be capable of transmitting limited amounts of power.

Accordingly, there is a need for flexible circuits and connector assemblies that facilitate controlling thermal energy generated during operation of the connector assemblies.

BRIEF DESCRIPTION OF THE INVENTION

In one embodiment, a connector assembly is provided that includes a communication connector comprising a base frame and a moveable side that is supported by the base frame. The moveable side has a mating array of terminals thereon and is configured to move with respect to the base frame between retracted and engaged positions to engage a communication component. The connector assembly also includes a flexible circuit including a flex interconnect that has opposite exterior surfaces. The flexible circuit is coupled to the moveable side. The connector assembly also includes a plurality of heat-dissipation elements that are attached to the flex interconnect and project away from one of the exterior surfaces. The heat-dissipation elements are configured to conduct thermal energy from the flex interconnect and transfer the thermal energy to an ambient environment.

In another embodiment, a connector assembly is provided that includes a communication connector comprising a base frame and a moveable side that is supported by the base frame. The moveable side has a mating array of terminals thereon. The moveable side is configured to move with respect to the base frame between retracted and engaged positions to engage a communication component. The connector assembly also includes a flexible circuit having a flex interconnect that has opposite exterior surfaces. The flexible circuit is coupled to the moveable side. The connector assembly also includes a thermal-control component that is attached to the flex interconnect along one of the exterior surfaces. The thermal-control component has a shroud that defines a passage extending alongside said one of the exterior surfaces. The passage directs air alongside said one of the exterior surfaces to remove thermal energy from the flexible circuit.

In another embodiment, a flexible circuit is provided that includes a mating panel having electrical contacts thereon and a flex interconnect that extends from the mating panel. The flex interconnect has opposite exterior surfaces and a plurality of stacked layers located between the exterior surfaces. The stacked layers include a conductor layer having electrical conductors that electrically connect to corresponding contacts on the mating panel. The flexible circuit also includes a plurality of heat-dissipation elements that are attached to the flex interconnect and project from one of the exterior surfaces. The heat-dissipation elements extend through said one of the exterior surfaces a depth into the flex interconnect. The heat-dissipation elements conduct thermal energy from the flex interconnect and transfers the thermal energy into the ambient environment.

BRIEF DESCRIPTION OF THE DRAWINGS

FIG. 2 is a perspective view of a flexible circuit formed in accordance with one embodiment shown in an unfolded condition having a heat-dissipating elements attached thereto.

FIG. 3 is a perspective view of the flexible circuit of FIG. 2 in a predetermined folded condition.

FIG. 4 is a schematic side view of the flexible circuit of FIG. 2 illustrating the heat-dissipating elements manufactured according to one embodiment.

FIG. 5 is a schematic side view of heat-dissipating elements that are manufactured according to an alternative embodiment.

FIG. 6 is a schematic side view of heat-dissipating elements that are manufactured according to an alternative embodiment.

DETAILED DESCRIPTION OF THE INVENTION

Figure 1:
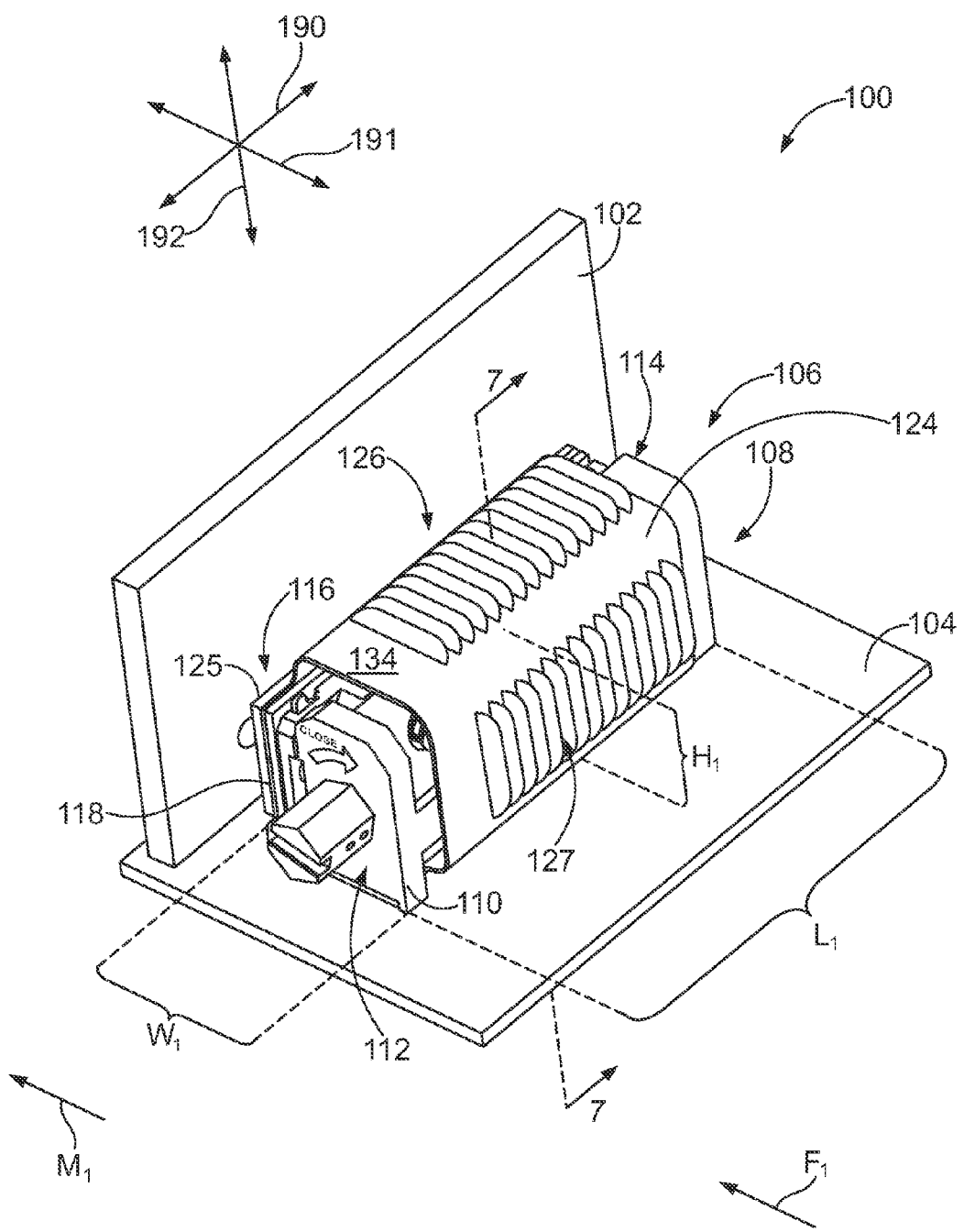
FIG. 1 is perspective view of a connector assembly formed in accordance with one embodiment.

Embodiments described herein include connector assemblies that are configured to establish at least one of an electrical or optical connection to transmit data signals and/or power between different communication components. Embodiments described herein also include connector assemblies having flexible circuits (or flex circuits) that may have various components attached thereto for dissipating heat. The connector assemblies may be configured to establish power connections between different communication components and/or communicative connections in which data signals are transmitted between the different communication components. Communication components that may be interconnected by the connector assemblies may be printed circuits (e.g., circuit boards or flex circuits), electrical or optical devices, connectors (e.g., optical and/or electrical connector assemblies), or any other components/devices that are capable of being communicatively coupled to one or more connector assemblies. The connector assemblies may include one or more moveable sides that are moveable between retracted and engaged positions with respect to a communication component.

By way of example, embodiments described herein include flexible circuits that extend between and mechanically and electrically and/or optically join first and second mating panels. Mating panels may have electrical contacts that include power contacts, ground contacts, and, optionally, signal contacts that are configured to transmit data signals when the first and second mating panels are engaged to other communication components. To this end, the flexible circuits may include electrical conductors (e.g., embedded traces) that convey current between the first and second mating panels. The electrical conductors of the flexible circuit may include signal conductors, power conductors, and ground conductors. In some embodiments, the power and signal conductors may be disposed within the flexible circuits so that the conductors are proximate to heat-dissipating elements as described below. The power conductors may also have dimensions that facilitate heat dissipation. Other features, dimensions, and configurations of the embodiments described herein may also facilitate controlling thermal energy. In some embodiments, the mating panels may have optical terminals that are configured to transmit data signals when the first and second mating panels are engaged to other communication components. As such, the flexible circuits may include optical fibers.

In some embodiments, the connector assemblies may include coupling mechanisms for moving a mating array of terminals. As used herein, the term "mating array" includes a plurality of terminals (e.g., electrical contacts or optical terminals) arranged in a predetermined configuration. The terminals may be held in a fixed relationship with respect to each other. The terminals of a mating array may be held together by a common structure or base material. For example, a mating array of electrical contacts may be held together by a board substrate that includes a dielectric material. The mating array may comprise the electrical contacts of a mating panel, such as those described above. The mating array may also comprise electrical contacts of an interposer that is mounted to a mating panel. An interposer generally includes a board substrate having opposite sides in which each side has a mating array of electrical contacts thereon.

A variety of terminals may be used. For example, some electrical contacts that may be used in the mating array include contacts that are stamped and formed, etched and formed, solder ball contacts, contact pads, and the like. In some embodiments, the terminals form a planar array (i.e., the terminals are arranged substantially on the same plane with respect to each other). In other embodiments, the terminals may have multiple sub-arrays of terminals that are not co-planar. In some embodiments, there may be multiple sub-arrays of terminals facing in a common direction. In other embodiments, there may be multiple sub-arrays of terminals facing in different directions. In some embodiments, the mating arrays also include fiber terminals that are communicatively coupled to optical fibers for transmitting data signals. As used herein, when two components are "communicatively coupled" or "communicatively connected," the two components can transmit electric current (e.g., for data signals or power) and/or light (e.g., optical data signals) therebetween.

As used herein, a "coupling mechanism" generally includes an operator-controlled actuator and one or more intermediate components that facilitate holding and selectively moving a moveable side. An operator may be an individual or machine. For example, the actuator may include an axle that rotates about an axis or a sliding member that slides in an axial direction. The intermediate components include mechanical parts that operatively couple the actuator to the moveable side and/or the mating array. For example, the intermediate components may include cams, cam fingers, roll bars, panels, springs, and the like that interact with the actuator. The intermediate components may facilitate converting a force provided by the actuator into a force that drives the moveable side and/or the mating array between different positions (e.g., retracted and engaged positions).

FIG. 1 is a perspective view of a communication system 100 that includes first and second communication components 102 and 104 that are communicatively coupled by a connector assembly 106. The communication system 100 is oriented with respect to mutually perpendicular axes 190-192, which may be referenced as a longitudinal axis 190 and lateral axes 191-192. The connector assembly 106 includes a connector 108 having a connector body or base frame 110. The base frame 110 may have an elongated structure that extends along the longitudinal axis 190 between opposite frame ends 112 and 114. The connector assembly 106 also includes a moveable side 116 that is supported by the base frame 110. The moveable side 116 includes a mating panel 118 and a mating array 120 (shown in FIG. 7) of terminals 122 (also shown in FIG. 7). In the illustrated embodiment, the mating array 120 is located on an interposer 125 that is mounted to the mating panel 118. However, in other embodiments, the mating array 120 may be located directly on the mating panel 118. The connector assembly 106 also includes a flexible circuit 124 that is coupled to the moveable side 116 and is folded about the base frame 110. In the illustrated embodiment, the terminals 122 are electrical contacts. However, it is understood that embodiments described herein may have optical terminals instead of or in addition to the electrical contacts. Exemplary optical terminals are described in greater detail in U.S. application Ser. No. 12/855,249, filed Aug. 12, 2010, which is incorporated by reference in its entirety.

The moveable side 116 is configured to be moved by the connector assembly 106 between retracted and engaged positions. In the retracted position as shown in FIG. 1, the mating array 120 is spaced apart from the communication component 102. The moveable side 116 may be selectively moved by the connector assembly 106 to an engaged position (shown in FIG. 8) in which the contacts 122 are communicatively engaged to the communication component 102 thereby establishing a communicative connection between the mating array 120 and the communication component 102. The flexible circuit 124 may transmit electric current (e.g., for power or data signals) and/or optical signals therethrough.

As shown, the connector assembly 106 has a length $L_1$, a width $W_1$, and a height $H_1$. In some embodiments, a largest dimension of the connector assembly 106 may be the length $L_1$, which extends along the longitudinal axis 190. In the illustrated embodiment, the mating array 120 is configured to move bi-directionally along a mating direction $M_1$ that is substantially orthogonal to the longitudinal axis 190. The mating direction $M_1$ may be parallel to the lateral axis 191.

The flexible circuit 124 may include a plurality of heat-dissipation elements 126 and 127. The heat-dissipation elements 126 and 127 may conduct thermal energy from the flexible circuit 124. The thermal energy may be generated by the flexible circuit 124 and/or may be conducted by the flexible circuit 124 from some other part or component of the communication system 100. Also shown, the heat-dissipation elements 126 and 127 may project from an exterior surface 134 (FIG. 2) of the flexible circuit 124 into an ambient environment that surrounds the heat-dissipation elements 126 and 127. In some embodiments, forced air exists within the communication system 100 to facilitate removing the thermal energy. A direction of the flow of the forced air through the heat-dissipation elements 126 and 127 is generally indicated by the arrow $F_1$. Of course, those having ordinary skill in the art understand that the forced air may be directed in other directions. Furthermore, it is understood that thermal energy may be transferred into the ambient environment without forced air.

The heat-dissipation elements 126 and 127 may be located on the flexible circuit 124 and/or sized and shaped to transfer the thermal energy into the ambient environment. In the illustrated embodiment, the heat-dissipation elements 126 and 127 are fin-shaped having planar surface areas that extend in a direction that is parallel to the airflow $F_1$. However, in alternative embodiments, the heat-dissipation elements 126 and 127 may have other shapes and/or configurations. For example, the heat-dissipation elements 126 and 127 may be rod-shaped or pin-shaped.

In the illustrated embodiment, the communication components 102 and 104 are shown as circuit boards (e.g., a daughter card and a motherboard). However, in other embodiments, the communication components 102 and 104 may be of other types, including other electrical or optical connectors, printed circuits, or any other apparatus that is capable of establishing a communicative/power connection. Moreover, in the illustrated embodiment, the first and second communication components 102 and 104 are located adjacent or proximate to each other and are oriented in a perpendicular manner. The flexible circuit 124 may be folded about the base frame 110 such that the flexible circuit 124 engages the second communication component 104 under the base frame 110. In other embodiments, the communication component 104 may be remotely located with respect to the communication component 102.

FIG. 2 is a perspective view of the flexible circuit 124 in an unfolded condition. As shown, the flexible circuit 124 includes the mating panel 118 and another mating panel 130. The flexible circuit 124 also includes a flex interconnect 132 that extends an operative length $L_2$ between and mechanically and communicatively joins the mating panels 118 and 130. The flex interconnect 132 also has an operative width $W_2$. In the illustrated embodiment, the flexible circuit 124 includes only two mating panels 118 and 130 that are joined by only a single flex interconnect 132. However, in alternative embodiments, more than two mating panels and/or more than one flex interconnect can be used. For example, two flex interconnects may join the mating panels 118 and 130. As another example, three mating panels could be joined in series by two flex interconnects. One flex interconnect could join first and second mating panels and another flex interconnect could join the second mating panel to a third mating panel.

As shown, the flex interconnect 132 has opposite exterior surfaces 134 and 136. The flex interconnect 132 comprises a sheet or film-like structure that is capable of bending or folding along the operative length $L_2$ and, in some cases, twisting about the width $W_2$. The mating panel 118 includes a mating array 170 of terminals 172 thereon. The mating panel 130 also includes a mating array 140 of terminals 142 thereon. Each of the mating panels 118 and 130 may have a respective engagement face 144 and 147 that is configured to interface with another communication component having a complementary array. Also shown in FIG. 2, each of the mating panels 118 and 130 may include one or more mounting holes 146 that are configured to receive fasteners (e.g., screws, plugs, and the like) to secure the mating panels to support structures. The mating panels 118 and 130 may also be secured to support structures using an adhesive or clips.

In the illustrated embodiment, the flex interconnect 132 may comprise sections 150-154 including base sections 150 and 154 and flex sections 151-153. The base sections 150 and 154 may extend along substantially the entire operative width $W_2$ and only a portion of the operative length $L_2$. The base sections 150 and 154 may represent portions of the flex interconnect 132 in which the heat-dissipation elements 126 and 127, respectively, are attached thereto. The heat-dissipation elements 126 may constitute a first set of heat-dissipation elements 126 when grouped together on the base section 150. The heat-dissipation elements 127 may constitute a second set of heat-dissipation elements 127 when grouped together on the base section 154.

FIG. 3 shows the flexible circuit 124 in a folded condition. In the illustrated embodiment, the flexible circuit 124 is folded about a fold axis 194 such that the operative length $L_2$ (FIG. 2) of the flex interconnect 132 extends around the fold axis 194. As shown, the mating panels 118 and 130 may be substantially perpendicular to each other when the flexible circuit 124 is in the folded condition. As shown, the flexible circuit 124 may form a plurality of sides $S_1$-$S_4$ in the folded condition. The mating panel 118 is positioned along the side $S_1$, and the mating panel 130 is positioned along the side $S_4$. The first set of heat-dissipation elements 126 is located along the side $S_2$, and the second set of heat-dissipation elements 127 is located along the side $S_3$. As such, the heat-dissipation elements 126 and 127 of the first and second sets may project in different directions away from the exterior surface 134. Also shown, the flex sections 151-153 (FIG. 2) become corner portions 161-163 of the flexible circuit 124. The flex interconnect 132 is folded or curves about the fold axis 194 at the corner portions 161-163.

However, FIG. 3 illustrates only one exemplary embodiment. In other embodiments, the mating panels 118 and 130 may have different positional relationships. For example, the mating panels 118 and 130 may extend parallel to each other or at a non-orthogonal angle. Also, the flexible circuit 124 may also take other shapes when in the folded condition. For instance, the flexible circuit 124 may have more than four sides with the three corner portions. In some embodiments, heat-dissipation elements may be attached to the corner portions 161-163. Such heat-dissipation elements would be shaped accordingly. Also, the flexible circuit is not required to extend around a fold axis, but may have a zigzag shape.

As shown in FIG. 3, the heat-dissipation elements 126 and 127 may also provide structural support or integrity to the base sections 150 and 154 of the flex interconnect 132 so that the base sections 150 and 154 remain in a predetermined condition throughout operation. For example, the heat-dissipation elements 126 may control the bending of the flex interconnect 132 about the fold axis 194 when the moveable side 116 (FIG. 1) is moved between the retracted and engaged positions. For example, the heat-dissipation elements 126 may be configured to limit the amount of bending or substantially prevent any bending. In the illustrated embodiment, the base sections 150 and 154 have a planar shape. However, in alternative embodiments, the base sections 150 and 154 may have other shapes that are maintained by the heat-dissipation elements 126 and 127. For example, the heat-dissipation elements may be rounded or L-shaped along the exterior surface 134.

FIG. 4 is a cross-section of the flex interconnect 132 having the heat-dissipation elements 126 attached thereto. Although the following is with respect to the heat-dissipation elements 126, the description may be similarly applied to the heat-dissipation elements 127. As shown, the flex interconnect 132 may comprise a composite structure that includes a plurality of stacked layers 201-206. Stacked layers of a flex interconnect may optionally include flex layers that comprise a flexible and insulating material (e.g., polyimide and the like); rigid layers (or stiffeners) that comprise a rigid material (e.g., FR-4, polyimide, polyimide glass, metals, and the like); bonding layers that comprise a bonding material (e.g., acrylic adhesive, modified epoxy, phenolic butyral, pressure-sensitive adhesive (PSA), preimpregnated material, and the like); thermal-control layers that comprise a thermally-conductive material that is configured to transfer thermal energy to heat-dissipation elements; and conductor and impedance-control layers that include an electrically-conductive material that is disposed, deposited, or etched in a predetermined manner. The electrically-conductive material may be copper (or a copper-alloy), cupro-nickel, silver epoxy, and the like. The thermally-conductive material may also be copper (or a copper-alloy), cupro-nickel, silver epoxy, and the like. The thermally-conductive material may be the same as or different than the electrically-conductive material.

As shown in FIG. 4, each of the stacked layers 201-206 may directly interface at least one other stacked layer. Two stacked layers that directly interface each other may also be referred to as immediately adjacent stacked layers. The flex interconnect 132 includes an outer flex layer 201 that has the exterior surface 134. Flex layers may comprise a flexible material (e.g., polyimide). The flexible material may facilitate separating the other layers from the surrounding environment or from each other. In addition, flex layers may also provide structure to the flex interconnect 132 while simultaneously allowing movement (i.e., flexing). In the illustrated embodiment, the flex layer 201 directly interfaces a thermal-control layer 202. The thermal-control layer 202 may directly interface a conductor layer 203. As shown, the conductor layer 203 includes an electrically-conductive material 208 and a bonding material 210. The electrically-conductive material 208 is disposed in a desired pattern to form electrical conductors 209 that may include at least one of signal conductors, power conductors, and ground conductors. The electrical conductors 209 may also be referred to as traces. In some embodiments, the electrical conductors 209 may be configured to transfer data signals. In other embodiments, the electrical conductors 209 may be dimensioned to transfer electrical power. For example, the electrical conductors 209 may have a width that is significantly greater than the height. The electrical conductors 209 may be similar to the power conductors described in U.S. patent application Ser. No. 12/947,533, filed Nov. 16, 2010, which is incorporated herein by reference in its entirety. The bonding material 210 is disposed around the electrically-conductive material 208. The bonding material 210 may be insulative and also thermally conductive.

The conductor layer 203 directly interfaces an inner flex layer 204 that, in turn, directly interfaces an impedance-control layer 205. The impedance-control layer 205 may be similar to the conductor layer 203 and comprise an electrically-conductive material 212 that facilitates shielding and/or controlling the impedance of the flex interconnect 132. The electrically-conductive material 212 may also be formed into power and/or ground conductors (not shown). Furthermore, the impedance-control layer 205 may include a bonding material 214 that is disposed along the electrically-conductive material 212. The bonding materials 210 and 214 may be, for example, an acrylic adhesive. Also shown, the impedance-control layer 205 directly interfaces an outer flex layer 206. The flex layer 206 includes the exterior surface 136. Also shown, the flex interconnect 132 may have a thickness $T_1$ that comprises the stacked layers 201-206.

The flex interconnects and flexible circuits described herein may be manufactured in various manners. For example, as shown in FIG. 4, the flex interconnect 132 may be manufactured by adding any one stacked layer to the stacked layer that directly interfaces said one stacked layer. More specifically, the impedance-control layer 205 may be added to the flex layer 204 by adding a layer of the electrically-conductive material 212 (e.g., copper) onto the flex layer 204. Optionally, the electrically-conductive material 212 may be etched to define, for example, power and/or ground conductors. The bonding material 214 may then be deposited over the electrically-conductive material 212 and the flex layer 206 may be added to the impedance-control layer 205. Furthermore, the conductor layer 203 may be added to the flex layer 204 by adding a layer of the electrically-conductive material 208 (e.g., copper) onto the flex layer 204 and etching the electrically-conductive material 208 to define the electrical conductors 209. The thermal-control layer 202 and the flex layer 201 may then be added.

In the illustrated embodiment, the flex layer 201 may have a plurality of openings or slits 216 that extend through the flex layer 201 from the exterior surface 134 to the thermal-control layer 202. The flex layer 201 may be manufactured to include the slits 216 or, alternatively, the slits 216 may be provided into the flex layer 201 after the flex layer 201 is attached to the thermal-control layer 202. In the illustrated embodiment shown in FIG. 4, the heat-dissipation elements 126 may be formed by repeatedly depositing a thermally-conductive material 218. The thermal-control layer 202 may also comprise the thermally-conductive material 218. For example, a base element layer 220A may be deposited within a corresponding one slit 216 onto the thermal-control layer 202. Subsequent element layers 220B may be deposited onto the base element layer 220A and each other to form a corresponding heat-dissipation element 126. As shown, the heat-dissipation elements 126 are separated from each other by a spacing $S_5$. Thus, the heat-dissipation elements 126 may comprise a plurality of element layers 220A and 220B stacked over one another. As shown, the heat-dissipation elements 126 may include opposite side surfaces 228 and 230. The side surfaces 228 and 230 are planar, but may take other shapes.

Accordingly, the heat-dissipation elements 126 may extend through the exterior surface 134 and extend a depth $D_1$ into the flex interconnect 132 (i.e., through at least one of the stacked layers (e.g., flex layer 201)). During operation of the flex interconnect 132, thermal energy generated by the electrical conductors 209 may transfer through the bonding material 210 and be absorbed by the thermal-control layer 202. The thermal energy may then transfer through the element layers 220A and 220B and into an ambient environment 225 of the flex interconnect 132. In some embodiments, the ambient environment 225 includes the forced air that is flowing in the direction $F_1$ (into the page in FIG. 4) along the side surfaces 228 and 230. In other embodiments, the air may flow in different directions or there may be no forced air at all.

FIGS. 5 and 6 illustrate flex interconnects 432 and 532, respectively, that are formed in accordance with alternative embodiments. As shown in FIG. 5, the flex interconnect 432 is similar to the flex interconnect 132 and includes a plurality of stacked layers 401-406. However, the flex interconnect 432 includes an outer thermal-control layer 401 along an exterior of the flex interconnect 432. The thermal-control layer 401 includes an exterior surface 434. The thermal-control layer 401 may be deposited directly onto a flex layer 402. In alternative embodiments, the flex layer 402 does not exist and the thermal-control layer 401 is deposited directly onto a bonding material 410 of a conductor layer 403. In this case, the heat-dissipation elements 426 would be in direct contact with a stacked layer that is immediately adjacent to the conductor layer 403. The heat-dissipation elements 426 may be manufactured in a similar manner as described above with respect to FIG. 4 by stacking element layers.

FIG. 6 illustrates heat-dissipation elements 516 that are stamped and formed. For example, stacked layers 502-506 may be manufactured in a similar manner as described above. A thermal-control layer may be formed elsewhere by stamping a sheet comprising a thermally-conductive material (e.g., copper) to shape the heat-dissipation elements 516. The heat-dissipation elements 516 may be formed by bending the stamped portions of the sheet and pulling the stamped portions away from the sheet thereby providing the heat-dissipation elements 516.

The heat-dissipation elements 126, 127 (FIG. 1), 426, and 526 are illustrated as being fin-shaped. As such, the heat-dissipation elements 126, 127, 426, and 526 include a thin strip of material that extends along a length of the flex interconnect (e.g., the operative length $L_2$ (FIG. 2)) and projects away from a corresponding exterior surface in a substantially perpendicular manner. However, the heat-dissipation elements 126, 127, 426, and 526 may take other shapes. For example, the heat-dissipation elements may be pin-shaped or rod-shaped. The heat-dissipation elements may also be thin strips such that a largest dimension of the heat-dissipation elements extends away from the exterior surface. Furthermore, the heat-dissipation elements may have various arrangements with respect to each other in order to facilitate heat transfer into the ambient environment.

Figure 13:
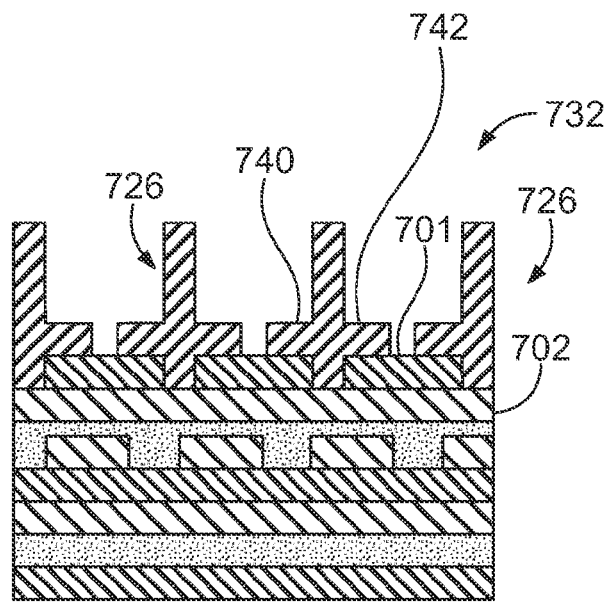
FIG. 13 is a schematic side view of heat-dissipating elements that are manufactured according to an alternative embodiment.
Figure 14:
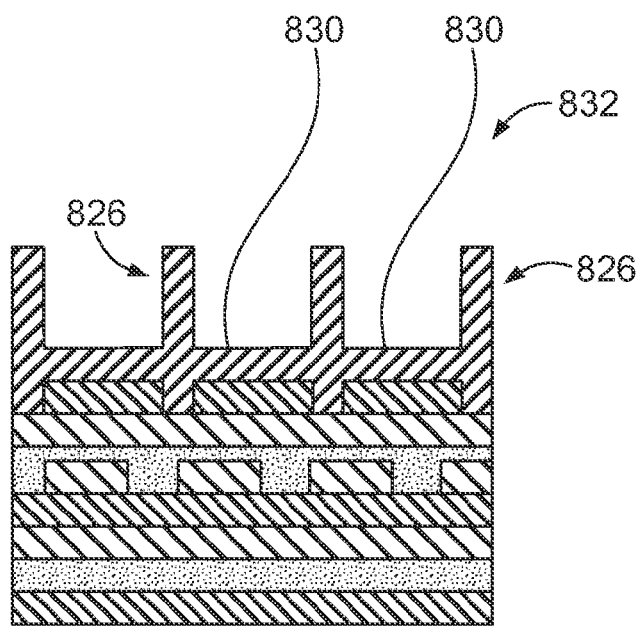
FIG. 14 is a schematic side view of heat-dissipating elements that are manufactured according to an alternative embodiment.

FIGS. 13 and 14 illustrate flex interconnects 732 and 832, respectively, that are formed in accordance with alternative embodiments. As shown in FIG. 13, the flex interconnect 732 is similar to the flex interconnects 132 and 432 (FIGS. 4 and 5, respectively). However, the flex interconnect 732 includes a plurality of cross-shaped heat-dissipation elements 726. The heat-dissipation elements 726 extend through a flex layer 701 and couple to a thermal-control layer 702. The heat-dissipation elements 726 include lateral portions 740 and 742 that extend alongside the flex layer 701. The flex interconnect 732 may be manufactured in a similar manner as the flex interconnects 132 and 432. The flex interconnect 832 shown in FIG. 14 is similar to the flex interconnect 732. However, the flex interconnect 832 does not include a plurality of separate heat-dissipation elements. Instead, heat-dissipation elements 826 are joined to each other by bridge portions 830. Each bridge portion 830 may extend entirely between two adjacent heat-dissipation elements 826.

Figure 7:
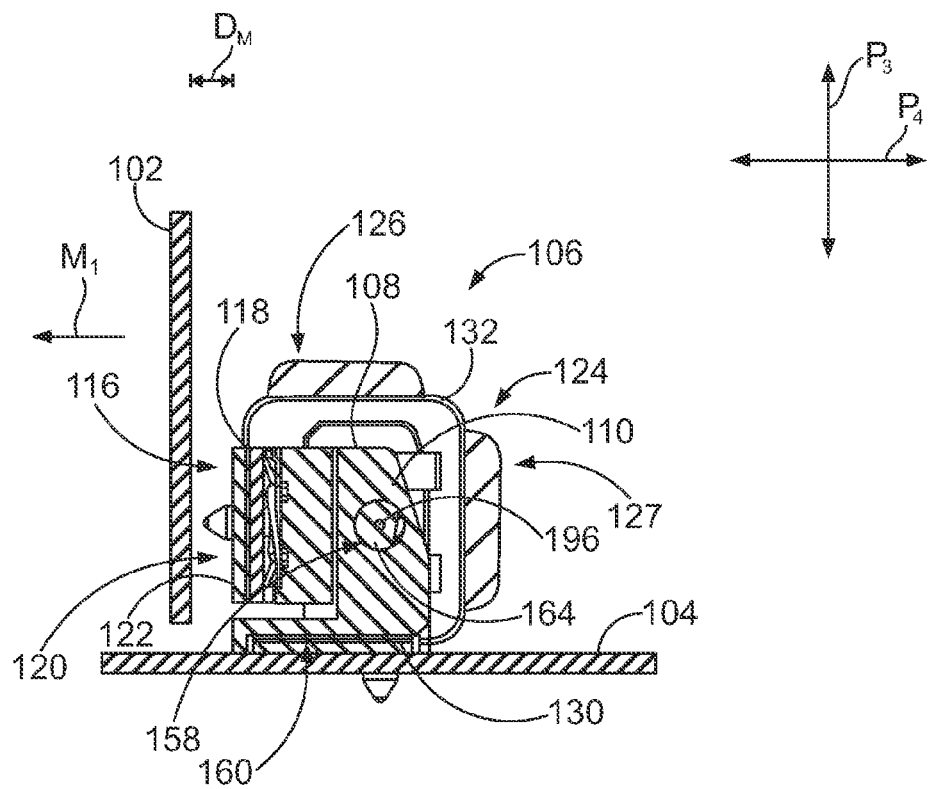
FIG. 7 is a cross-section of the connector assembly of FIG. 1 taken along line 7-7 when the connector assembly in a retracted state or position.
Figure 8:
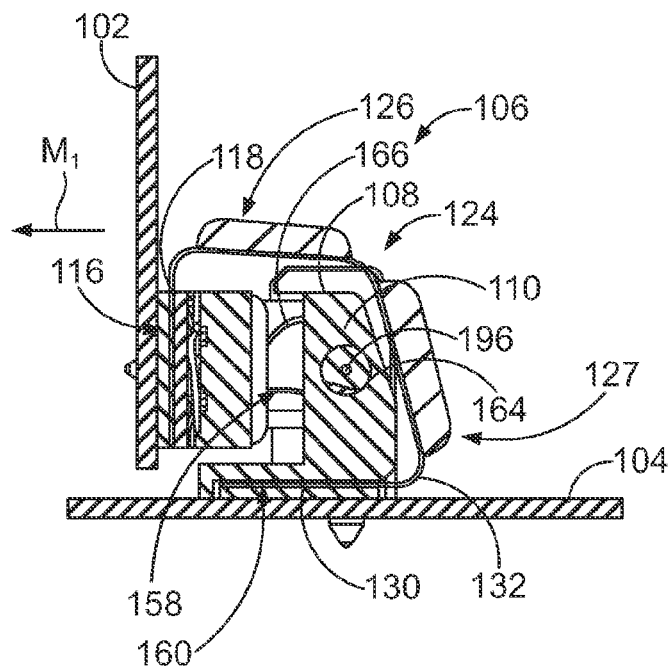
FIG. 8 is a cross-section of the connector assembly of FIG. 1 when the connector assembly in an engaged state position.

FIGS. 7 and 8 are cross-sections of the connector assembly 106 when the connector assembly 106 is in a retracted position and in an engaged position, respectively. As shown, the connector 108 includes the moveable side 116 and a mounting side 160. The moveable side 116 includes the first mating panel 118 of the flexible circuit 124, and the mounting side 160 includes the second mating panel 130 of the flexible circuit 124. When the mating panel 130 is secured to the mounting side 160, the connector assembly 106 may be mounted to the communication component 104 (e.g., a motherboard). The mating panels 118 and 130 may extend in a direction along a central axis 196. The central axis 196 extends parallel to the longitudinal axis 190 (FIG. 1) and the fold axis 194 (FIG. 3). Furthermore, the mating panels 118 and 130 may extend along respective planes $P_3$ and $P_4$ (FIG. 7) when the flexible circuit 124 is in the folded condition. The respective planes $P_3$ and $P_4$ are substantially perpendicular to one another in the illustrated embodiment.

The connector assembly 106 may include a coupling mechanism 158 that is operatively coupled to the moveable side 116 and configured to selectively move the moveable side 116 between the retracted position (FIG. 7) and the engaged position (FIG. 8). The base frame 110 may support the moveable side 116 in the retracted position and also in the engaged position using slidable pistons or rods (not shown). The coupling mechanism 158 may include an operator-controlled actuator 164 that is movably supported by the base frame 110. The actuator 164 is shown as a rotatable axle in the exemplary embodiment that rotates about the central axis 196. The actuator 164 may be coupled to cam fingers 166 (FIG. 8) that drive the moveable side 116 in the mating direction $M_1$ when the actuator 164 is rotated about the central axis 196 in a counter-clockwise manner. The actuator 164 may be selectively rotated by a machine or by an individual.

The operative length $L_2$ (FIG. 2) of the flex interconnect 132 is sized to permit the moveable side 116 to move between the retracted and engaged positions. In the retracted position, the mating array 120 (FIG. 7) is spaced apart from a complementary array (not shown) of the communication component 102. In the engaged position, the contacts 122 of the mating array 120 are engaged with corresponding electrical contacts (not shown) of the complementary array. In the illustrated embodiment, the moveable side 116 moves a mating distance $D_M$ (FIG. 7) in a linear manner so that the mating array 120 and the complementary array may engage. As the moveable side 116 is moved between the retracted and engaged positions, the heat-dissipation elements 126 and 127 move with the flex interconnect 132.

However, alternative operator-controlled actuators may be used in other embodiments. For example, an operator-controlled actuator may include a sliding member that slides in a direction along the central axis 196 in FIG. 7. The sliding member may be shaped to include ridges, sloped edges, cam members, or other intermediate components that interact with the moveable side 116 to drive the moveable side 116 in the mating direction $M_1$. By way of another example, the operator-controlled actuator may be slidable along the central axis 196 and have ramps that engage roll bars or bearings within the connector assembly. When the ramps push the bearings outward, a moveable side is also pushed in a direction away from the central axis 196 toward the communication component 102. Such a coupling mechanism is described in greater detail in U.S. patent application Ser. No. 12/685,398, which is incorporated by reference in the entirety. In addition to the above examples, other coupling mechanisms may be used such as those described in U.S. patent application Ser. Nos. 12/428,851; 12/428,806; 12/686,484; 12/686,518; 12/757, 835; and 12/646,314, which are all incorporated by reference in the entirety.

Figure 9:
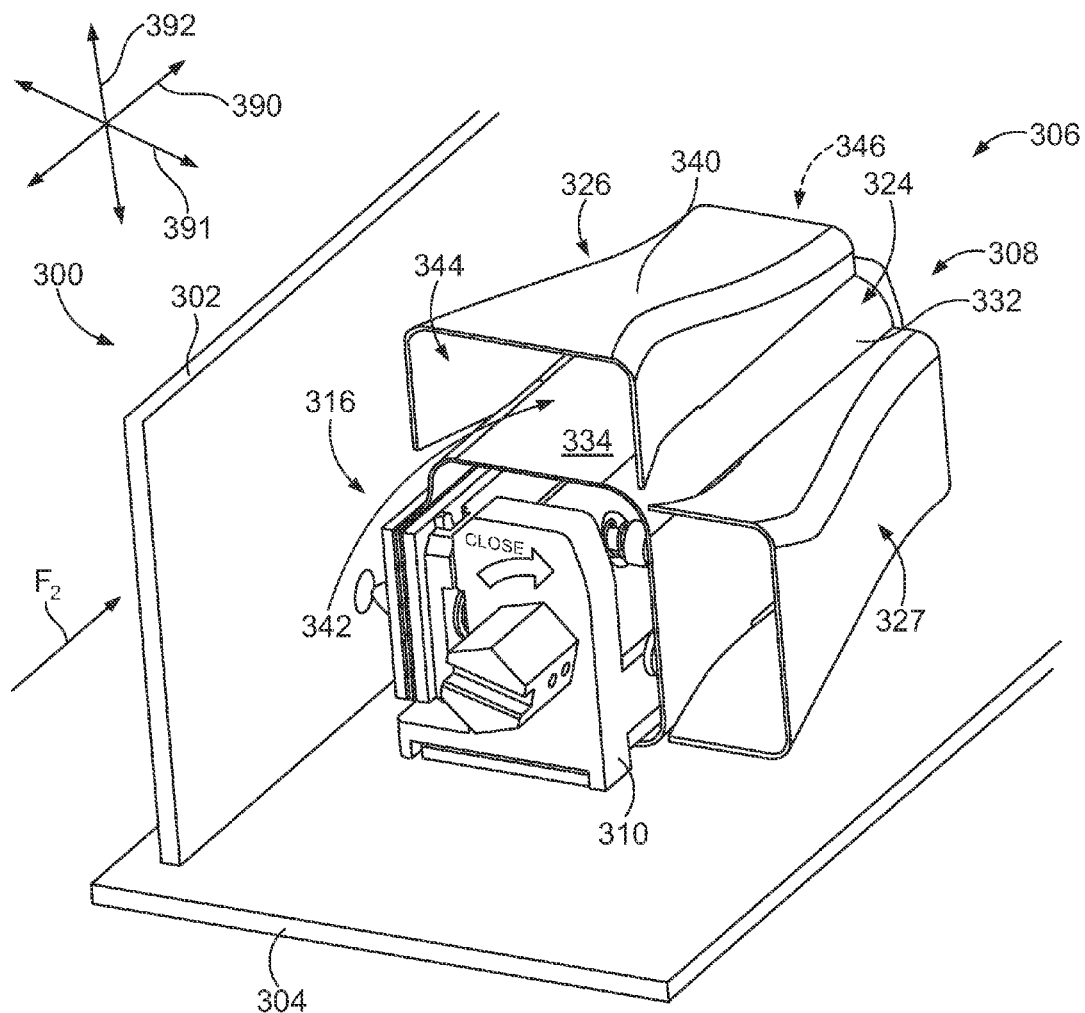
FIG. 9 is perspective view of a connector assembly formed in accordance with one embodiment having a thermal-control component attached thereto.
Figure 10:
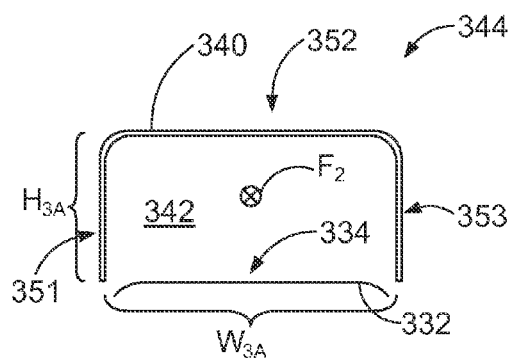
FIG. 10 illustrates an inlet cross-section of the thermal-control component in FIG. 9.
Figure 11:
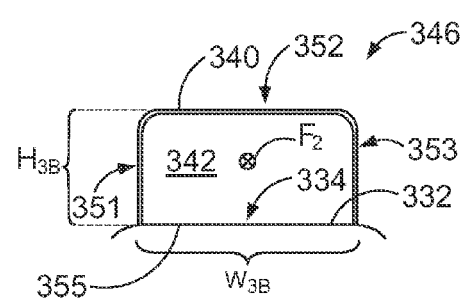
FIG. 11 illustrates an outlet cross-section of the thermal-control component in FIG. 9.

FIGS. 9-11 illustrate an electrical system 300 formed in accordance with another embodiment. FIG. 9 is a perspective view of the electrical system 300 that includes first and second communication components 302 and 304, respectively, and a connector assembly 306 that communicatively couples the communication components 302 and 304. The connector assembly 306 may include similar features and operate in a similar manner as the connector assembly 106 shown in FIG. 1. The electrical system 300 is oriented with respect to mutually perpendicular axes 390-392 that include a longitudinal axis 390 and lateral axes 391-392. The connector assembly 306 includes an electrical connector 308 having a connector body or base frame 310. The connector assembly 306 also includes a moveable side 316 that is supported by the base frame 310, and a flexible circuit 324 that is coupled to the moveable side 316 and is folded about the base frame 310. The base frame 310, the moveable side 316, and the flexible circuit 324 may be similar the base frame 110, the moveable side 116, and the flexible circuit 124 shown in FIG. 1. Similar to the connector assembly 106, the connector assembly 306 is configured to move the moveable side 316 between retracted and engaged positions.

Also shown in FIG. 9, the connector assembly 306 includes thermal-control components 326 and 327. Although the following is with specific reference to the thermal-control component 326, the description may be similarly applied to the thermal-control component 327. The thermal-control component 326 includes a shroud 340 that is mounted to an exterior surface 334 of a flex interconnect 332. The shroud 340 defines a passage 342 that extends alongside the exterior surface 334 in a direction that is generally along the longitudinal axis 390. The passage 342 extends between an inlet 344 and an outlet 346. The inlet 344 is configured to receive forced air that may be generally flowing in a direction $F_2$. The forced air is further directed by the shroud 340 to the outlet 346. As the air flows along the exterior surface 334, the air may absorb and remove thermal energy from the flexible circuit 324. Thermal-control component 326 is configured to move with the flex interconnect 332 when the moveable side 316 is moved between the retracted and engaged positions.

FIGS. 10 and 11 illustrates cross-sections of the inlet 344 and the outlet 346, respectively, that are taken perpendicular to the direction $F_2$ of airflow through the passage 342. As shown in FIGS. 10 and 11, the shroud 340 includes wall portions 351-353 that attach to the exterior surface 334 of the flex interconnect 332. The wall portions 351 and 353 face each other across the passage 342, and the wall portion 352 faces the exterior surface 334. The wall portion 352 joins the wall portions 351 and 353. The passage 342 is defined by the wall portions 351-353.

In particular embodiments, the cross-section of the inlet 344 may have greater dimensions than the cross-section of the outlet 346. As the shroud 340 extends in the direction of airflow $F_2$, dimensions of the passage 342 may reduce. For example, the inlet 344 may have a height $H_{3A}$ and a width $W_{3A}$, and the outlet 346 may have a height $H_{3B}$ and a width $W_{3B}$. In particular embodiments, the height $H_{3A}$ may be greater than the height $H_{3B}$, and the width $W_{3A}$ may be greater than the width $W_{3B}$. As such, forced air that enters the inlet 344 may be funneled through a narrowing cross-sectional area of the passage 342, thereby increasing a flow rate of the forced air through the passage 342 to facilitate the removal of thermal energy.

As shown in FIG. 11, edges of the wall portions 351 and 353 may be mounted to the exterior surface 334 using, for example, a thermally-conductive adhesive. The portion of the flex interconnect 332 that the shroud 340 is mounted over may be a base section 355 of the flex interconnect 332. Accordingly, the shroud 340 may provide structural support or integrity to the flex interconnect 332 so that the base section 355 of the flex interconnect 332 remains substantially in a predetermined condition when the moveable side 316 is moved between the retracted and engaged positions.

Figure 12:
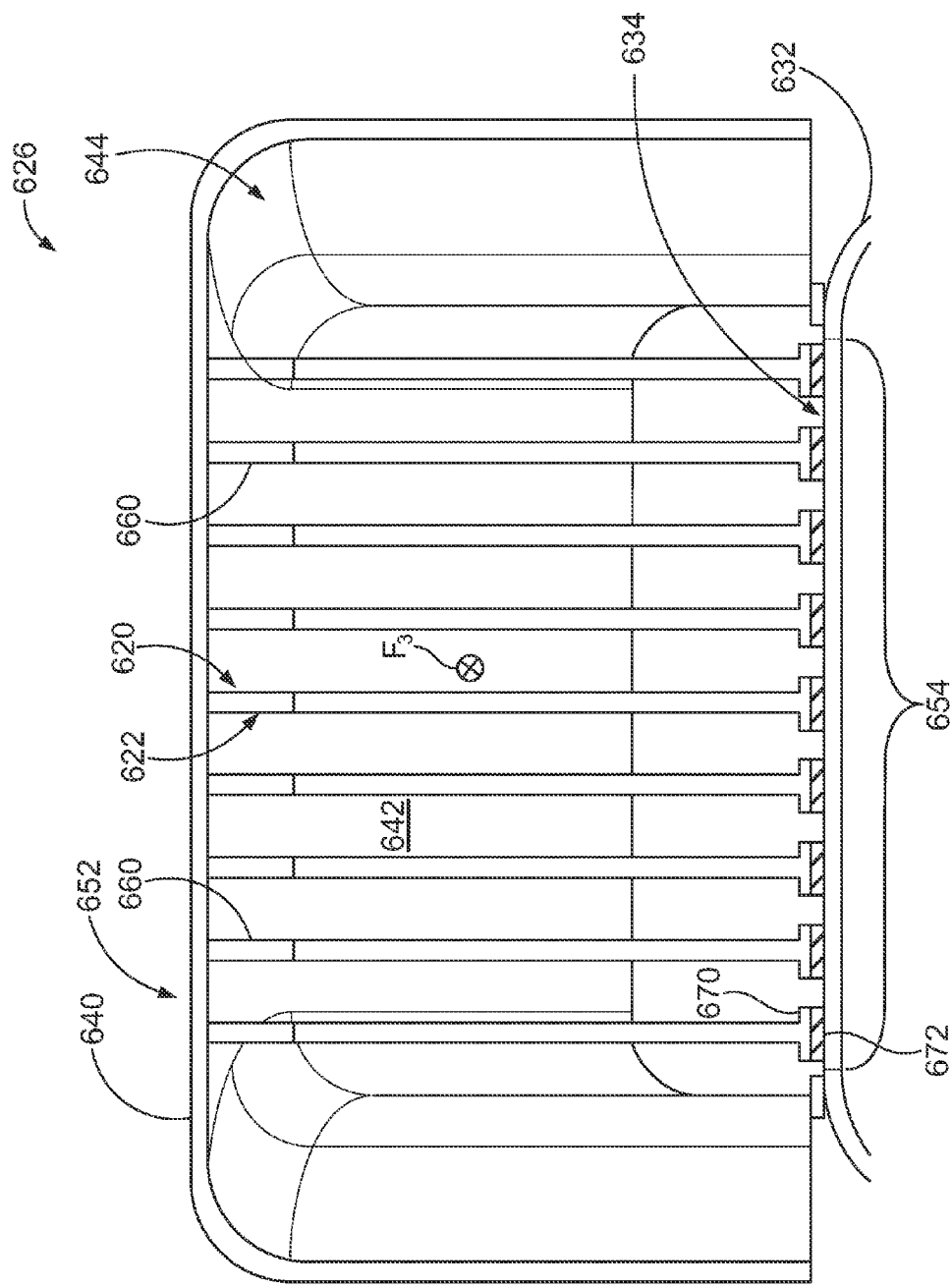
FIG. 12 is perspective view of a connector assembly formed in accordance with another embodiment having a thermal-control component attached thereto.

FIG. 12 is front view of a thermal-control component 626 formed in accordance with another embodiment. The thermal-control component 626 may be part of a connector assembly (not shown) similar to the connector assembly 306 (FIG. 9). The thermal-control component 626 may be similar to the thermal-control component 326 shown in FIG. 9. For example, the thermal-control component 626 includes a shroud 640 that is mounted to an exterior surface 634 of a flex interconnect 632. The shroud 640 defines a passage 642 that extends alongside the exterior surface 634. The passage 642 extends between an inlet 644 and an outlet (not shown). A cross-section of the passage 642 may reduce in a similar manner as described above with respect to the shroud 640.

In addition, the thermal-control component 626 may include a plurality of heat-dissipation elements 660 that are disposed within the passage 642. The heat-dissipation elements 660 may be shaped to permit air to flow through the passage 642. For example, the heat-dissipation elements 660 may be fin-shaped having opposite side surfaces 620 and 622 that extend in a direction that is parallel to the flow of air $F_3$. The heat-dissipation elements 660 may be spaced apart from one another to permit air to flow therebetween.

In the illustrated embodiment, the shroud 640 includes a wall portion 652 that faces a base section 654 of the flex interconnect 632. The heat-dissipation elements 660 extend from the wall portion 652 toward the base section 654. The heat-dissipation elements 660 may include element ends 670 that engage the exterior surface 634 of the base section 654. The element ends 670 may be attached to the flex interconnect 632 using a thermally-conductive adhesive 672. Accordingly, the heat-dissipation elements 660 and the shroud 640 may be mounted to the flex interconnect 632. The thermal-control component 626 may be configured to provide structural support or integrity to the base section 654 so that the base section 654 remains in a predetermined condition during operation of the connector assembly. For example, the base section 654 may remain planar when the thermal-control component 626 is moved with the flex interconnect 632.

Embodiments described herein may include connector assemblies that are configured to dissipate heat, such as the connector assemblies 106 and 306 described above. The connector assemblies may include heat-dissipation elements and/or thermal-control components such as those described above. Embodiments described herein may also include flexible circuits that are configured to remove thermal energy from the flexible circuit. For example, with reference to FIGS. 2 and 4, some embodiments include a flexible circuit 124 that has a mating panel 118 (FIG. 2) and electrical contacts 172 (FIG. 2) thereon. The flexible circuit 124 may also include a flex interconnect 132 that extends from the mating panel 118. The flex interconnect 132 has opposite exterior surfaces 134 and 136 and a plurality of stacked layers 201-206 (FIG. 4) located between the exterior surfaces 134 and 136. The stacked layers 201-206 include a conductor layer 203 (FIG. 4) having electrical conductors 209 that electrically connect to corresponding contacts 172 on the mating panel 118. The flexible circuit 124 also includes a plurality of heat-dissipation elements 126 that are attached to the flex interconnect 132 and project from one of the exterior surfaces (e.g., the exterior surface 134). The heat-dissipation elements 126 extend through the exterior surface 134 a depth $D_1$ (FIG. 4)

into the flex interconnect 132. The heat-dissipation elements 126 conduct thermal energy from the flex interconnect 132 and transfer the thermal energy into the ambient environment.

Although the illustrated embodiments are described with reference to electrically interconnecting printed circuits and, more specifically, circuit boards, the description herein is not intended to be limited to printed circuits or circuit boards. Embodiments described herein may also be used to interconnect other communication components.

It is to be understood that the above description is intended to be illustrative, and not restrictive. As such, other connector assemblies and coupling mechanisms may be made as described herein that couple a moveable mating array to another array of contacts. For example, the connector assemblies and coupling mechanisms may be like the connector assemblies and coupling mechanisms described in U.S. patent application Ser. Nos. 12/428,851; 12/428,806; 12/686,484; 12/686,518; 12/757,835; 12/646,314; and 12/685,398. Furthermore, connector assemblies described herein may also be configured to move a plurality of mating arrays in different directions and/or at different times according to a predetermined sequence. Such connector assemblies are described in greater detail in U.S. patent application Ser. Nos. 12/686,484 and 12/686,518, which are incorporated by reference in their entirety. In these cases, thermal-control components and/or heat-dissipation elements attached to the flex interconnects may also move in different directions and/or at different times according to a predetermined sequence.

In addition, the above-described embodiments (and/or aspects or features thereof) may be used in combination with each other. Furthermore, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
a communication connector comprising a base frame and a moveable side that is supported by the base frame, the base frame including a mounting side that is configured to be mounted to a board surface of a circuit board, the moveable side having a mating array of terminals thereon, the moveable side being configured to move with respect to the base frame between retracted and engaged positions to engage a communication component, wherein the moveable side moves away from the base frame and the mounting side when the moveable side moves toward the communication component to the engaged position;
a flexible circuit including a flex interconnect that has opposite exterior surfaces, the flexible circuit being coupled to the moveable side; and
a plurality of heat-dissipation elements attached to the flex interconnect and projecting away from one of the exterior surfaces, the heat-dissipation elements configured to conduct thermal energy from the flex interconnect and transfer the thermal energy to an ambient environment.

2. The connector assembly in accordance with claim 1, wherein the heat-dissipation elements move with the flex interconnect when the moveable side is moved between the retracted and engaged positions.

3. The connector assembly in accordance with claim 1, wherein the flex interconnect includes a plurality of stacked layers between the exterior surfaces, the stacked layers including a conductor layer having electrical conductors for transmitting at least one of data signals or power, the heat-dissipation elements being in direct contact with one of the conductor layer or a stacked layer that is immediately adjacent to the conductor layer and directly interfaces with the conductor layer.

4. The connector assembly in accordance with claim 1 further comprising a thermal-control component attached to the flex interconnect that includes a shroud that defines a passage therethrough, the passage extending alongside the flex interconnect and the heat-dissipation elements being disposed within the passage.

5. The connector assembly in accordance with claim 4, wherein the thermal-control component provides structural support so that the flex interconnect remains in a predetermined condition when the moveable side is moved between the retracted and engaged positions.

6. The connector assembly in accordance with claim 1, wherein the plurality of heat-dissipation elements include first and second sets of heat-dissipation elements, the flex interconnect including a flex section that is located between the first and second sets, the flex interconnect being folded at the flex section during operation of the connector assembly such that the heat-dissipation elements of the first and second sets project in different directions away from the base frame.

7. The connector assembly in accordance with claim 1, wherein the base frame extends along a longitudinal axis, the moveable side being moved in a mating direction that is substantially orthogonal to the longitudinal axis, wherein a separation distance between the moveable side and the mounting side of the base frame increases as the moveable side is moved away from the base frame to the engaged position.

8. The connector assembly in accordance with claim 1, wherein the moveable side is driven in a linear manner between the engaged and retracted positions.

9. The connector assembly in accordance with claim 1 further comprising a coupling mechanism that is operatively coupled to the moveable side, the coupling mechanism driving the moveable side between the retracted and engaged positions.

10. The connector assembly in accordance with claim 9, wherein the coupling mechanism comprises an operator-controlled actuator that is movably supported by the base frame, the coupling mechanism including at least one intermediate component that operatively couples the actuator to the moveable side.

11. The connector assembly of claim 1, wherein the flexible circuit includes first and second mating panels joined by the flex interconnect, the first mating panel being coupled to the movable side and including the mating array, the second mating panel including a different mating array and being secured to the mounting side in a fixed position, wherein the first mating panel is movable with respect to the base frame and the second mating panel.

12. The connector assembly of claim 1, further comprising the circuit board, wherein the base frame is mounted to the board surface at the mounting side, and wherein a separation distance between the moveable side and the mounting side of the base frame increases as the moveable side is moved away from the base frame to the engaged position.

13. The connector assembly of claim 12, wherein the flexible circuit includes first and second mating panels joined by the flex interconnect, the first mating panel including the mating array and the second mating panel including a different mating array, the second mating panel and the base frame being secured to the circuit board and having fixed positions relative to each other.

14. The connector assembly of claim 1, wherein the moveable side moves in a direction that is parallel to the board surface or away from the board surface when the moveable side moves away from the base frame toward the communication component to the engaged position.

15. The connector assembly of claim 1, wherein the base frame has a central longitudinal axis that extends along a length of the base frame, the flexible circuit being folded about the longitudinal axis such that a portion of the flex interconnect extends away from the board surface, the portion of the flex interconnect moving toward the base frame as the moveable side moves toward the communication component to the engaged position.

16. A connector assembly comprising:
   a communication connector comprising a base frame and a moveable side that is supported by the base frame, the moveable side has a mating array of terminals thereon, the moveable side being configured to move with respect to the base frame between retracted and engaged positions to engage a communication component;
   a flexible circuit including a flex interconnect that has opposite exterior surfaces, the flexible circuit being coupled to the moveable side; and
   a plurality of heat-dissipation elements attached to the flex interconnect and projecting away from one of the exterior surfaces, the heat-dissipation elements configured to conduct thermal energy from the flex interconnect and transfer the thermal energy to an ambient environment;
   wherein the flex interconnect includes a plurality of stacked layers between the exterior surfaces, the heat-dissipation elements extending through said one of the exterior surfaces and through at least one of the stacked layers into the flex interconnect.

17. The connector assembly of claim 16, wherein the plurality of heat-dissipation elements include first and second sets of heat-dissipation elements, the flex interconnect including a flex section that is located between the first and second sets, the flex interconnect being folded at the flex section during operation of the connector assembly such that the heat-dissipation elements of the first and second sets project in different directions.

18. The connector assembly of claim 16, wherein moveable side moves away from the base frame when moved toward the communication component to the engaged position.

19. The connector assembly of claim 16, further comprising a coupling mechanism that is operatively coupled to the moveable side, the coupling mechanism driving the moveable side between the retracted and engaged positions.

20. The connector assembly of claim 19, wherein the coupling mechanism comprises an operator-controlled actuator that is movably supported by the base frame, the coupling mechanism including at least one intermediate component that engages the actuator and operatively couples the actuator to the moveable side.

* * * * *